(12) United States Patent
Lee

(10) Patent No.: US 8,293,090 B2
(45) Date of Patent: Oct. 23, 2012

(54) ELECTROOSMOTIC DEHYDRATOR

(75) Inventor: Yeong Chae Lee, Busan (KR)

(73) Assignees: Korea Water Technology Inc., Gyeongsangnam-do (KR); Yeong Chae Lee, Busan (KR)

( * ) Notice: Subject to any disclaimer, the term of this patent is extended or adjusted under 35 U.S.C. 154(b) by 530 days.

(21) Appl. No.: 12/599,058

(22) PCT Filed: Jan. 25, 2008

(86) PCT No.: PCT/KR2008/000467
§ 371 (c)(1),
(2), (4) Date: Nov. 6, 2009

(87) PCT Pub. No.: WO2008/140175
PCT Pub. Date: Nov. 20, 2008

(65) Prior Publication Data
US 2010/0236933 A1 Sep. 23, 2010

(30) Foreign Application Priority Data
May 14, 2007 (KR) .................. 10-2007-0046494

(51) Int. Cl.
*B01D 61/56* (2006.01)
(52) U.S. Cl. ....................................... 204/649; 204/639
(58) Field of Classification Search .................. 204/649, 204/648
See application file for complete search history.

(56) References Cited

U.S. PATENT DOCUMENTS

| 5,192,413 A | 3/1993 | Yamaguchi et al. |
| 5,891,342 A | 4/1999 | Tije |
| 2003/0209437 A1* | 11/2003 | McInerney et al. ........... 204/515 |

FOREIGN PATENT DOCUMENTS

| KR | 1997-7006055 | 11/1997 |
| KR | 10-0452145 | 9/2004 |
| KR | 10-0507686 | 8/2005 |

* cited by examiner

*Primary Examiner* — Arun S Phasge
(74) *Attorney, Agent, or Firm* — Fish & Richardson P.C.

(57) ABSTRACT

The present invention relates to an electroosmotic dehydrator, and more specifically to an electroosmotic dehydrator having a structure of improving durability and electrical conductivity of a drum that is a core part of the electroosmotic dehydrator, making it possible to secure stable dehydrating work, extend use lifetime, and reduce power consumption. According to the present invention, An electroosmotic dehydrator comprising: a drum applied with + or −; a caterpillar or an electrode plate applied with + or − by being mounted to be spaced by a constant space portion from the drum; and a filter cloth belt wound for transfer and dehydration of sludge between the drum and the caterpillar or the electrode plate, characterized in that a copper plate is mounted to an outer side surface of the drum and a titanium plate is coated with a coating agent of platinum-based metal to an outer side surface of the copper plate.

2 Claims, 4 Drawing Sheets

ELECTROOSMOTIC DEHYDRATOR

TECHNICAL FIELD

The present invention relates to an electroosmotic dehydrator, and more specifically to an electroosmotic dehydrator having a structure of improving durability and electrical conductivity of a drum that is a core part of the electroosmotic dehydrator, making it possible to secure stable dehydrating work, extend use lifetime, and reduce power consumption.

BACKGROUND ART

Generally, an electroosmotic dehydrator is an apparatus that is applied with a direct current power supply for forming electric field to remove water coupled with sludge by electrophoretic property and dehydrates water contained in the sludge by means of a voltage difference.

The structure comprises a drum largely applied with a + and −; a caterpillar applied with + or − pole by being mounted to be spaced by a constant space portion from the drum; and a filter cloth belt wound for transfer and dehydration of sludge between the drum and the caterpillar.

Herein, there may be an electroosmotic dehydrator comprising an electrode plate applied with − or +, which rotates at an endless track such as the caterpillar, instead of the caterpillar.

Such a conventional electroosmotic dehydrator applies constant pure direct current voltage between the drum and the caterpillar (or electrode plate) to form electric field and transfers water around liquid sludge particles charged in the electric field to an electrode opposite to a charge taken by the sludge particles by means of electrophoresis and capillary phenomena to separate and remove water.

In other words, since the sludge particles have − surface charge, if the electric field is applied to the sludge, the sludge particles move to a positive (+) pole and the water in the sludge particle layer moves to a negative (−) pole, thereby promoting the dehydration.

However, since such a conventional electroosmotic dehydrator has a structure that the drum is made of only stainless, an electrochemical reaction occurs by the electric field generating between the drum and the caterpillar (or electrode plate) when performing the dehydrating work so that the surface of the drum is electrolyzed, thereby causing large and small corrosion on the surface thereof.

And, the drum is heated at high temperature by means of coulombic heating generated between the drum and the caterpillar (or electrode plate) to generate vapor, thereby causing more serious corrosion on the surface of the drum as well as a change in an external form.

Therefore, the use lifetime of the drum is shortened more than expected, the electrical conductivity of the drum is degraded, and the dehydration performance is degraded, thereby causing problems that maintenance cost of the dehydrator is increased, power consumption required for the operation of the dehydrator is increased, and water content of the sludge is increased.

DISCLOSURE OF INVENTION

Technical Problem

The present invention proposes to solve the aforementioned problems. It is an object of the present invention to provide an electroosmotic dehydrator with increased durability and electrical conductivity comprising a copper plate mounted to an outer side surface of a drum and a titanium plate coated with a coating agent of platinum based metal that is mounted to an outer side surface of the copper plate so as to increase durability and electrical conductivity of the drum.

Technical Solution

An electroosmotic dehydrator 100 of the present invention comprising a drum 1 applied with + or −; a caterpillar 2 or an electrode plate applied with + or − by being mounted to be spaced by a constant space portion from the drum; and a filter cloth belt 3 wound for transfer and dehydration of sludge between the drum and the caterpillar or the electrode plate, characterized in that a copper plate 4 is mounted to an outer side surface of the drum 1 and a titanium plate 6 is coated with a coating agent 5 of platinum-based metal to an outer side surface of the copper plate 4.

The drum 1 is made of a stainless plate and has a thickness of 8T, the copper plate 4 has a thickness of 1T and the titanium plate 6 has a thickness of 1T.

An inner side surface of the drum 1 is mounted with a water cooling jacket 8 in a cylindrical shape having a space portion within which cooling water is circulated.

The copper plate 4 and the titanium plate 6 is mounted to the drum 1 without being spaced from each other by means of a plurality of bolts 9 whose heads are coated with the coating agent 5 of platinum-based metal and penetrate through the cooper plate 4 and the titanium plate 6 to be coupled to the drum 1.

The water cooling jacket 8 is made of lightweight and strong anti-corrosion stainless so as to be smoothly rotated and prevent corrosion by means of the cooling water.

Herein, although not shown, the water cooling jacket 8 is connected to a cooling water supplying apparatus supplying the cooling water that is separately mounted to the electroosmotic dehydrator 100 to smoothly circulate the cooling water therein.

Also, although not shown, the electroosmotic dehydrator 100 does not use the caterpillar 2 and includes a structure mounted with the electrode plate applied with − or +, which rotates at an endless track such as the caterpillar 2.

In non-explained numerals in the drawings, 10 is a cooling water supplying nozzle mounted to the water cooling jacket 8 and 11 is a water cooling supplying tube connecting the cooling water supplying nozzle 10 to the cooling water supplying apparatus.

The electroosmotic dehydrator 100 of the present invention is an apparatus that dehydrates the sludge by separating water contained in the sludge from the sludge through electrophoretic property and capillary phenomenon by means of a voltage difference in an applied direct current power supply, as shown in FIG. 1.

In particular, the electroosmotic dehydrator 100 of the present invention improve the durability and electrical conductivity of the drum 1, which is a core part, making it possible to extend its use lifetime and improve dehydration performance.

As shown in FIGS. 2 to 4, the electroosmotic dehydrator comprises the water cooling jacket 8 mounted to the inner side surface of the drum 1 made of stainless to circulate the cooling water, the copper plate 4 mounted to the outer side surface of the drum 1 and the titanium plate 6 coated with the coating agent 5 of platinum-based metal and mounted to the outer side surface of the copper plate. The operation thereof will be described in more detail.

First, the sludge to be hydrated is injected through a hopper (not shown) and the sludge injected into the hopper flows in the filter cloth belt 3 and is then transferred along the drum 1.

Thereafter, the water contained in the sludge transferred along the drum 1 is dyhydrated through the electrophoresis and capillary phenomena by electric field generated between the drum 1 and the caterpillar 2 each applied with (+) direct current voltage and (−) direct current voltage.

At this time, the drum 1 has high strength, high lightweight and high anti-corrosion by means of the titanium plate 6 mounted to the outer side surface thereof.

Furthermore, the drum 1 becomes an insoluable electrode by means of the coating agent 5 of platinum-based metal coated on the surface of the titanium plate 6 to very slightly emit metal ions upon performing the dehydrating work so that the electrolysis is little performed, thereby making it strong against the electrochemical corrosion.

Therefore, the disadvantage of the conventional electroosmotic dehydrator that large and small corrosion is caused on the outer peripheral surface of the drum 1 by means of the electrochemical reaction performed between the drum 1 and the caterpillar 2 is solved, making it possible to increase the durability of the drum 1.

Herein, the lifetime for preventing the corrosion of the drum 1 may be varied according to the thickness of the coating agent 5. For example, when the thickness of the coating agent 5 is 1 micron, it has the lifetime of about 1 year.

Therefore, when the thickness of the coating agent is large, the lifetime for preventing the corrosion of the drum 1 can be further extended.

And, the electrical conductivity of the drum 1 is improved several times by means of the copper plate 4 mounted between the outer side surface thereof and the inner side surface of the titanium plate 6, thereby smoothing the flow of electricity and reducing coulombic heating.

Therefore, the electrical field between the drum 1 and the caterpillar 2 can be more effectively improved as well as the generation of vapor can be suppressed so that the dehydrating work can be stably and effectively performed as well as the power consumption required for the dehydrating work can be reduced.

Also, the drum 1 is continuously cooled by means of the water cooling jacket 8 mounted to the inner peripheral surface thereof so that the deformation or corrosion of the drum 1 due to heat are prevented, making it possible to extend the use lifetime of the drum 1 and secure the stable dehydrating work.

Therefore, the disadvantage of the conventional electroosmotic dehydrator that the drum 1 not having a separate cooling means is heated by high temperature heat generated while the electrical field is formed between the drum 1 and the caterpillar 2 so that it is easily corroded or deformed can be solved.

When the copper plate 4 and the titanium plate 6 are mounted to the outer peripheral surface of the drum 1, without performing the welding as shown in FIG. 2, the plurality of bolts 9, which are screw-connected to the drum at a constant interval by penetrating through the copper plate 4 and the titanium plate 6, is used.

Since the welding damages the coating agent 5 coated on the titanium plate 6, this is for closely mounting the drum 1 to the copper plate 4 and the titanium plate 6 without causing a gap therebetween while preventing the damage of the coating agent.

Advantageous Effects

The present invention constituted as described above has an effect that the use lifetime of the drum 1 is extended according to the durability reinforce of the drum 1 and the electrical conductivity of the drum 1 so that the maintenance cost of the dehydrator 100 can be reduced and the electric field is effectively generated and the power consumption is reduced so that the hydration performance can be improved and the stable dehydrating work can be secured.

DETAILED DESCRIPTION OF MAIN ELEMENTS

Figure 1:
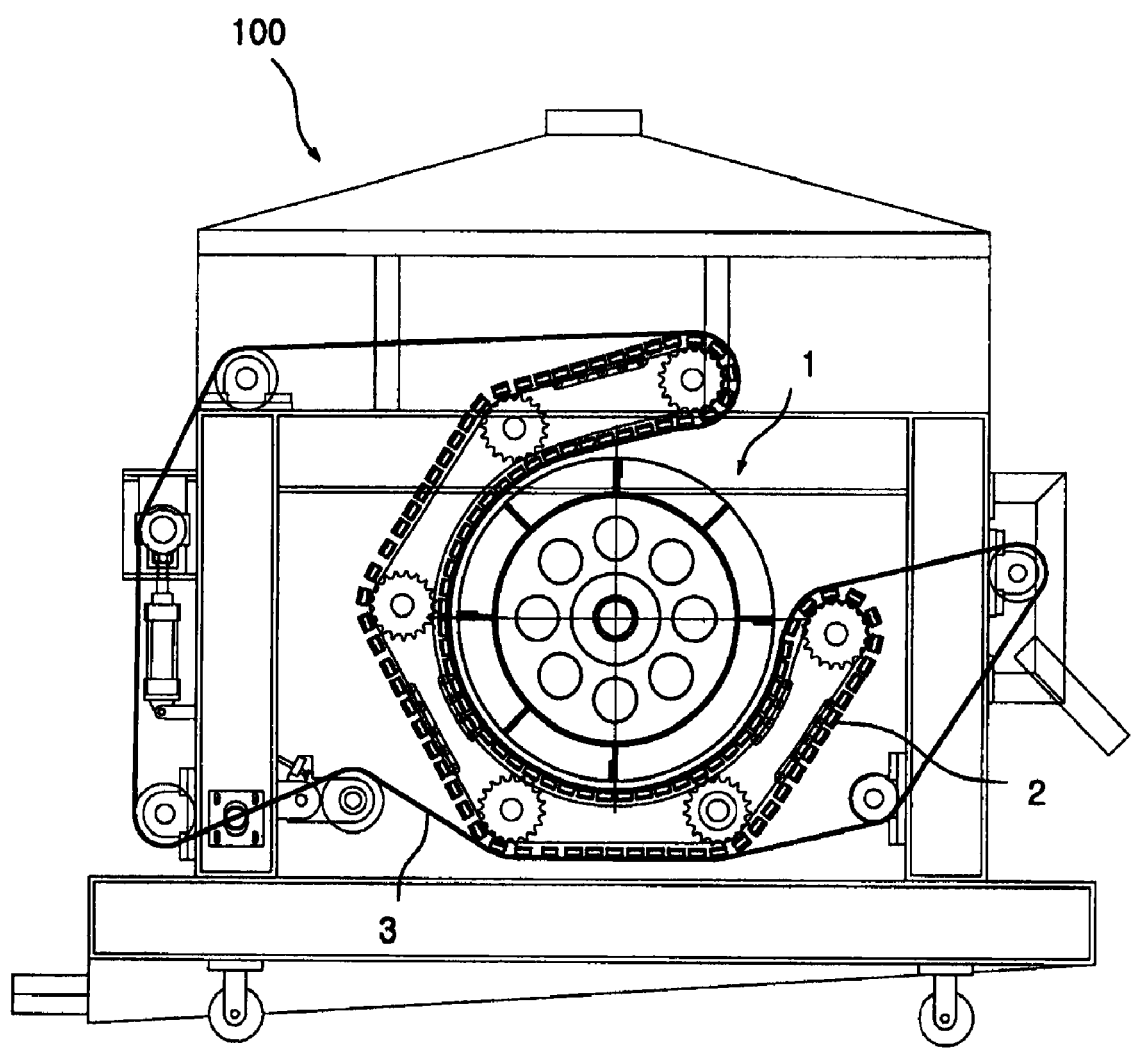
FIG. 1 is an inner perspective cross-sectional view of an electroosmotic dehydrator of the present invention.

1: drum
2: caterpillar
3: filter cloth belt
4: copper plate
5: coating agent
6: titanium plate
7: space portion
8: water cooling jacket
9: bolt
10: cooling water supplying nozzle
11: cooling water supplying tube
100: electroosmotic dehydrator

BEST MODE FOR CARRYING OUT THE INVENTION

Reference will now be made in detail to preferred embodiments of the present invention, examples of which are illustrated in the accompanying drawings.

Figure 2:
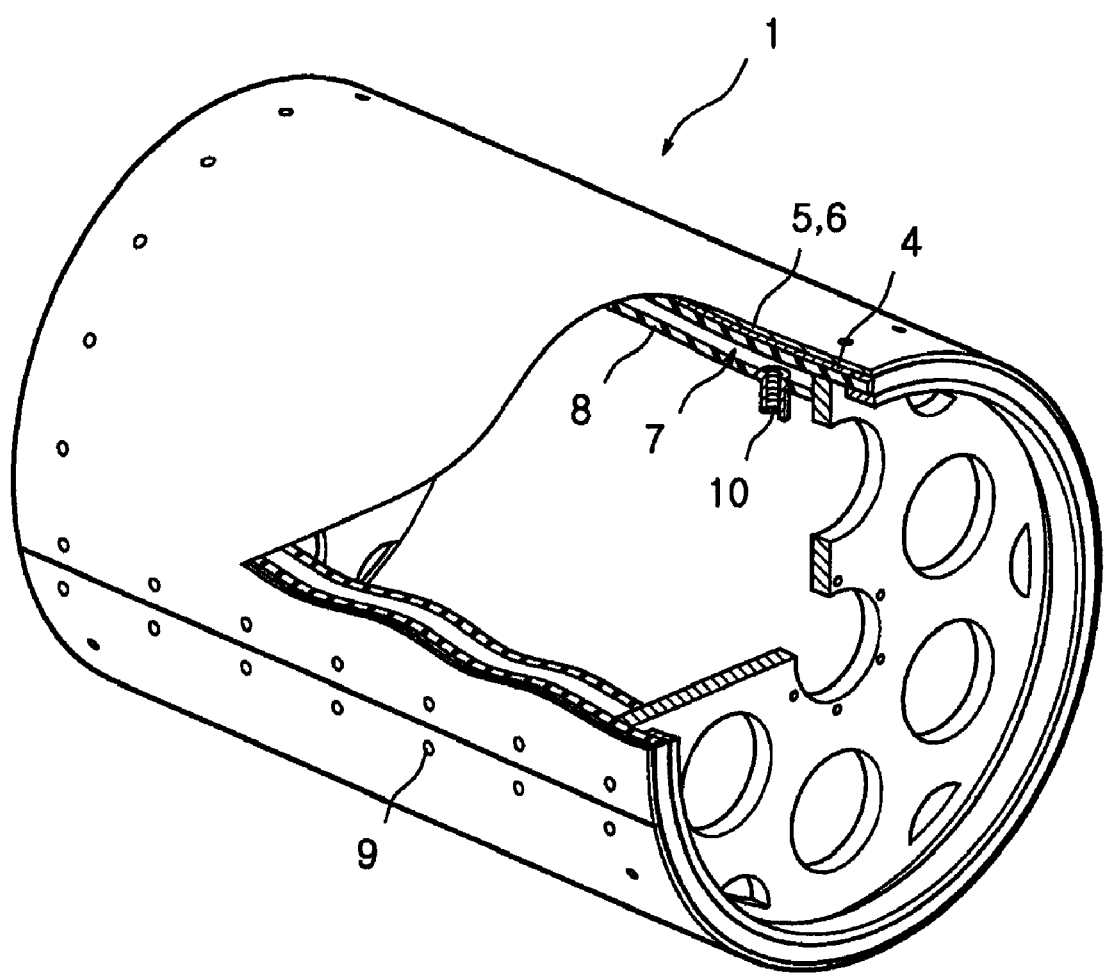
FIG. 2 is a portion cutaway perspective view showing a main part of the present invention.
Figure 3:
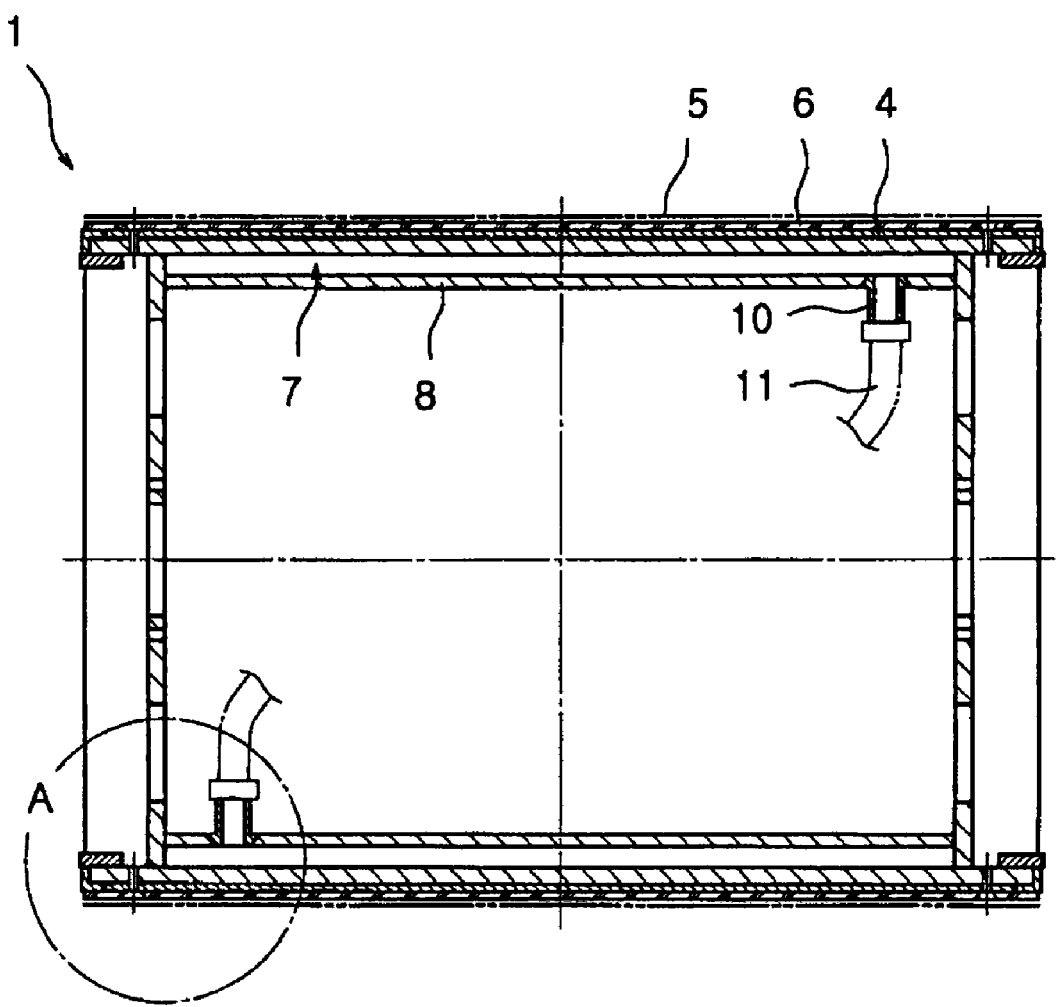
FIG. 3 is a cross-sectional view showing a main part of the present invention.
Figure 4:
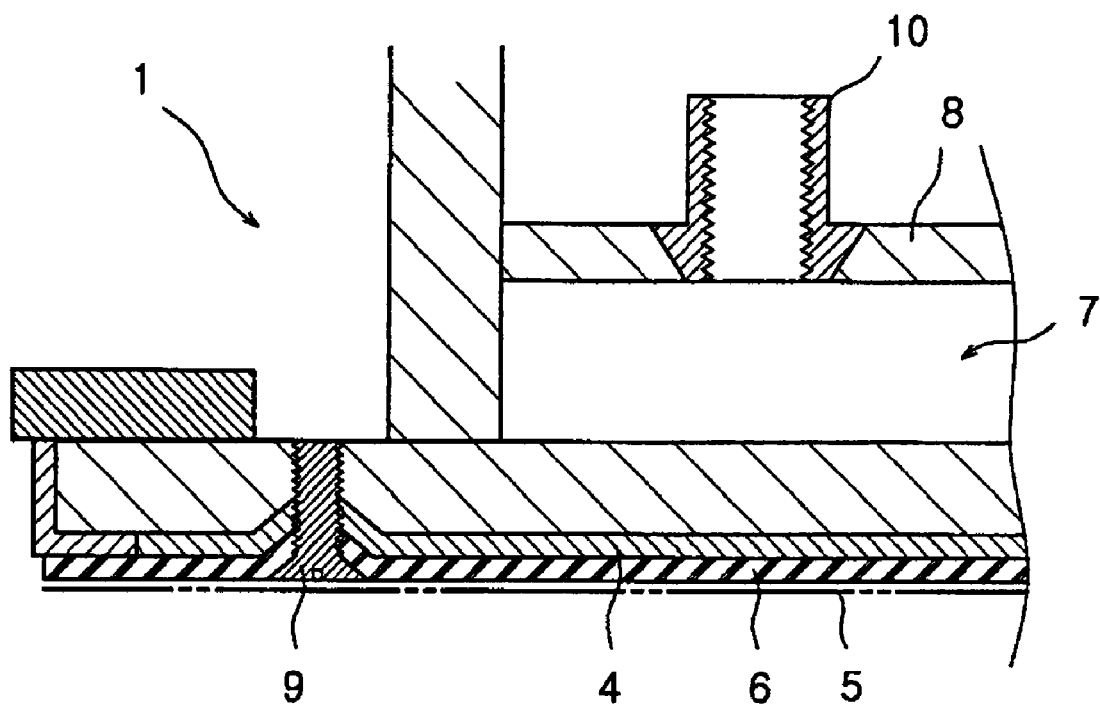
FIG. 4 is an enlarged cross-sectional view of A of FIG. 3.

FIG. 1 is an inner perspective cross-sectional view of an electroosmotic dehydrator of the present invention, and FIG. 2 is a portion cutaway perspective view showing a main part of the present invention, and FIG. 3 is a cross-sectional view showing a main part of the present invention, FIG. 4 is an enlarged cross-sectional view of A of FIG. 3.

An electroosmotic dehydrator 100 of the present invention comprising a drum 1 applied with + or −; a caterpillar 2 or an electrode plate applied with + or − by being mounted to be spaced by a constant space portion from the drum; and a filter cloth belt 3 wound for transfer and dehydration of sludge between the drum and the caterpillar or the electrode plate, characterized in that a copper plate 4 is mounted to an outer side surface of the drum 1 and a titanium plate 6 is coated with a coating agent 5 of platinum-based metal to an outer side surface of the copper plate 4.

The drum 1 is made of a stainless plate and has a thickness of 8T, the copper plate 4 has a thickness of IT and the titanium plate 6 has a thickness of IT.

An inner side surface of the drum 1 is mounted with a water cooling jacket 8 in a cylindrical shape having a space portion within which cooling water is circulated.

The copper plate 4 and the titanium plate 6 is mounted to the drum 1 without being spaced from each other by means of a plurality of bolts 9 whose heads are coated with the coating agent 5 of platinum-based metal and penetrate through the cooper plate 4 and the titanium plate 6 to be coupled to the drum 1.

The water cooling jacket 8 is made of lightweight and strong anti-corrosion stainless so as to be smoothly rotated and prevent corrosion by means of the cooling water.

Herein, although not shown, the water cooling jacket 8 is connected to a cooling water supplying apparatus supplying the cooling water that is separately mounted to the electroosmotic dehydrator 100 to smoothly circulate the cooling water therein.

Also, although not shown, the electroosmotic dehydrator 100 does not use the caterpillar 2 and includes a structure mounted with the electrode plate applied with − or +, which rotates at an endless track such as the caterpillar 2.

In non-explained numerals in the drawings, 10 is a cooling water supplying nozzle mounted to the water cooling jacket 8 and 11 is a water cooling supplying tube connecting the cooling water supplying nozzle 10 to the cooling water supplying apparatus.

The electroosmotic dehydrator 100 of the present invention is an apparatus that dehydrates the sludge by separating water contained in the sludge from the sludge through electrophoretic property and capillary phenomenon by means of a voltage difference in an applied direct current power supply, as shown in FIG. 1.

In particular, the electroosmotic dehydrator 100 of the present invention improve the durability and electrical conductivity of the drum 1, which is a core part, making it possible to extend its use lifetime and improve dehydration performance.

As shown in FIGS. 2 to 4, the electroosmotic dehydrator comprises the water cooling jacket 8 mounted to the inner side surface of the drum 1 made of stainless to circulate the cooling water, the copper plate 4 mounted to the outer side surface of the drum 1 and the titanium plate 6 coated with the coating agent 5 of platinum-based metal and mounted to the outer side surface of the copper plate. The operation thereof will be described in more detail.

First, the sludge to be hydrated is injected through a hopper (not shown) and the sludge injected into the hopper flows in the filter cloth belt 3 and is then transferred along the drum 1.

Thereafter, the water contained in the sludge transferred along the drum 1 is dyhydrated through the electrophoresis and capillary phenomena by electric field generated between the drum 1 and the caterpillar 2 each applied with (+) direct current voltage and (−) direct current voltage.

At this time, the drum 1 has high strength, high lightweight and high anti-corrosion by means of the titanium plate 6 mounted to the outer side surface thereof.

Furthermore, the drum 1 becomes an insoluable electrode by means of the coating agent 5 of platinum-based metal coated on the surface of the titanium plate 6 to very slightly emit metal ions upon performing the dehydrating work so that the electrolysis is little performed, thereby making it strong against the electrochemical corrosion.

Therefore, the disadvantage of the conventional electroosmotic dehydrator that large and small corrosion is caused on the outer peripheral surface of the drum 1 by means of the electrochemical reaction performed between the drum 1 and the caterpillar 2 is solved, making it possible to increase the durability of the drum 1.

Herein, the lifetime for preventing the corrosion of the drum 1 may be varied according to the thickness of the coating agent 5. For example, when the thickness of the coating agent 5 is 1 micron, it has the lifetime of about 1 year.

Therefore, when the thickness of the coating agent is large, the lifetime for preventing the corrosion of the drum 1 can be further extended.

And, the electrical conductivity of the drum 1 is improved several times by means of the copper plate 4 mounted between the outer side surface thereof and the inner side surface of the titanium plate 6, thereby smoothing the flow of electricity and reducing coulombic heating.

Therefore, the electrical field between the drum 1 and the caterpillar 2 can be more effectively improved as well as the generation of vapor can be suppressed so that the dehydrating work can be stably and effectively performed as well as the power consumption required for the dehydrating work can be reduced.

Also, the chum 1 is continuously cooled by means of the water cooling jacket 8 mounted to the inner peripheral surface thereof so that the deformation or corrosion of the drum 1 due to heat are prevented, making it possible to extend the use lifetime of the drum 1 and secure the stable dehydrating work.

Therefore, the disadvantage of the conventional electroosmotic dehydrator that the drum 1 not having a separate cooling means is heated by high temperature heat generated while the electrical field is formed between the drum 1 and the caterpillar 2 so that it is easily corroded or deformed can be solved.

When the copper plate 4 and the titanium plate 6 are mounted to the outer peripheral surface of the drum 1, without performing the welding as shown in FIG. 2, the plurality of bolts 9, which are screw-connected to the drum at a constant interval by penetrating through the copper plate 4 and the titanium plate 6, is used.

Since the welding damages the coating agent 5 coated on the titanium plate 6, this is for closely mounting the drum 1 to the copper plate 4 and the titanium plate 6 without causing a gap therebetween while preventing the damage of the coating agent.

INDUSTRIAL APPLICABILITY

The present invention proposes to solve the aforementioned problems. The copper plate is mounted to the outer side surface of the drum and the titanium plate coated with a coating agent of platinum-based metal is mounted to the outer side surface of the copper plate to increase durability and electrical conductivity of the drum so that the use lifetime of the drum is extended according to the durability reinforce of the drum and the electrical conductivity of the drum to reduce the maintenance cost of the dehydrator 100 and the electric field is effectively generated and the power consumption is reduced to improve the hydration performance and secure the stable dehydrating work.

What is claimed is:

1. An electroosmotic dehydrator comprising:
   a drum applied with + or −;
   a caterpillar or an electrode plate applied with + or − by being mounted to be spaced by a constant space portion from the drum; and
   a filter cloth belt wound for transfer and dehydration of sludge between the drum and the caterpillar or the electrode plate, wherein a copper plate is mounted to an outer side surface of the drum and a titanium plate is coated with a coating agent of platinum-based metal to an outer side surface of the copper plate, wherein the copper plate and the titanium plate are mounted to the drum, without being spaced from each other, by means of a plurality of bolts whose heads are coated with the coating agent of platinum-based metal and penetrate through the copper plate and the titanium plate to be screw-connected to the drum.

2. The electroosmotic dehydrator according to claim 1, wherein an inner side surface of the drum 1 is mounted with a water cooling jacket 8 having a surface 7 within which cooling water is circulated.

* * * * *